US008792148B2

(12) United States Patent  
Sugiyama et al.

(10) Patent No.: US 8,792,148 B2  
(45) Date of Patent: Jul. 29, 2014

(54) INSPECTION METHOD AND INSPECTION APPARATUS FOR AN IMAGE READING APPARATUS

(75) Inventors: Takayuki Sugiyama, Utsunomiya (JP); Tadao Hayashide, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 958 days.

(21) Appl. No.: 12/904,699

(22) Filed: Oct. 14, 2010

(65) Prior Publication Data

US 2011/0090547 A1 Apr. 21, 2011

(30) Foreign Application Priority Data

Oct. 15, 2009 (JP) ................................. 2009-238335

(51) Int. Cl.
*H04N 1/56* (2006.01)
*H04N 1/58* (2006.01)
*H04N 1/60* (2006.01)
*H04N 1/00* (2006.01)
*H04N 1/04* (2006.01)

(52) U.S. Cl.
USPC ........... 358/505; 358/501; 358/504; 358/518; 358/401; 358/406; 358/474; 358/497

(58) Field of Classification Search
None
See application file for complete search history.

(56) References Cited

U.S. PATENT DOCUMENTS

| 6,263,117 B1 * | 7/2001 | Lee ................................. 382/254 |
| 6,747,766 B1 * | 6/2004 | Kamisuwa et al. ........... 358/505 |
| 6,894,263 B2 | 5/2005 | Fujibayashi et al. |
| 2002/0163739 A1 | 11/2002 | Hayashide et al. |
| 2003/0038228 A1 | 2/2003 | Fujibayashi et al. |
| 2004/0257600 A1 * | 12/2004 | Hiromatsu ...................... 358/1.9 |
| 2005/0200689 A1 * | 9/2005 | Shinohara et al. ............ 347/116 |
| 2005/0206978 A1 * | 9/2005 | Sone .............................. 358/516 |
| 2006/0098243 A1 * | 5/2006 | Ahmed et al. ................. 358/474 |
| 2009/0122369 A1 * | 5/2009 | Minamino ..................... 358/505 |
| 2010/0302607 A1 * | 12/2010 | Hock ............................. 358/474 |

FOREIGN PATENT DOCUMENTS

| JP | 2000-171705 A | 6/2000 |
| JP | 2000-332958 A | 11/2000 |
| JP | 2002-335375 A | 11/2002 |
| JP | 2008-078877 A | 4/2008 |

* cited by examiner

*Primary Examiner* — King Poon
*Assistant Examiner* — Beniyam Menberu
(74) *Attorney, Agent, or Firm* — Rossi, Kimms & McDowell LLP

(57) ABSTRACT

An inspection method for an image reading apparatus where image information of an original is imaged on light receiving element lines arranged in a main scanning direction to read the information on different colors. The method includes: acquiring a first color misregistration from image information based on a first striped pattern located at a position optically equivalent to a surface of the original with respect to the light receiving element lines, the first pattern having white and black lines aligned, and having longitudinal directions of the white and black lines aligned in a sub-scanning direction; acquiring a second color misregistration from image information based on a second striped pattern having white and black lines aligned, and having longitudinal directions of the white and black lines aligned at an angle from the main scanning direction; and calculating a color misregistration in the sub-scanning direction based on the measured color misregistrations.

8 Claims, 6 Drawing Sheets

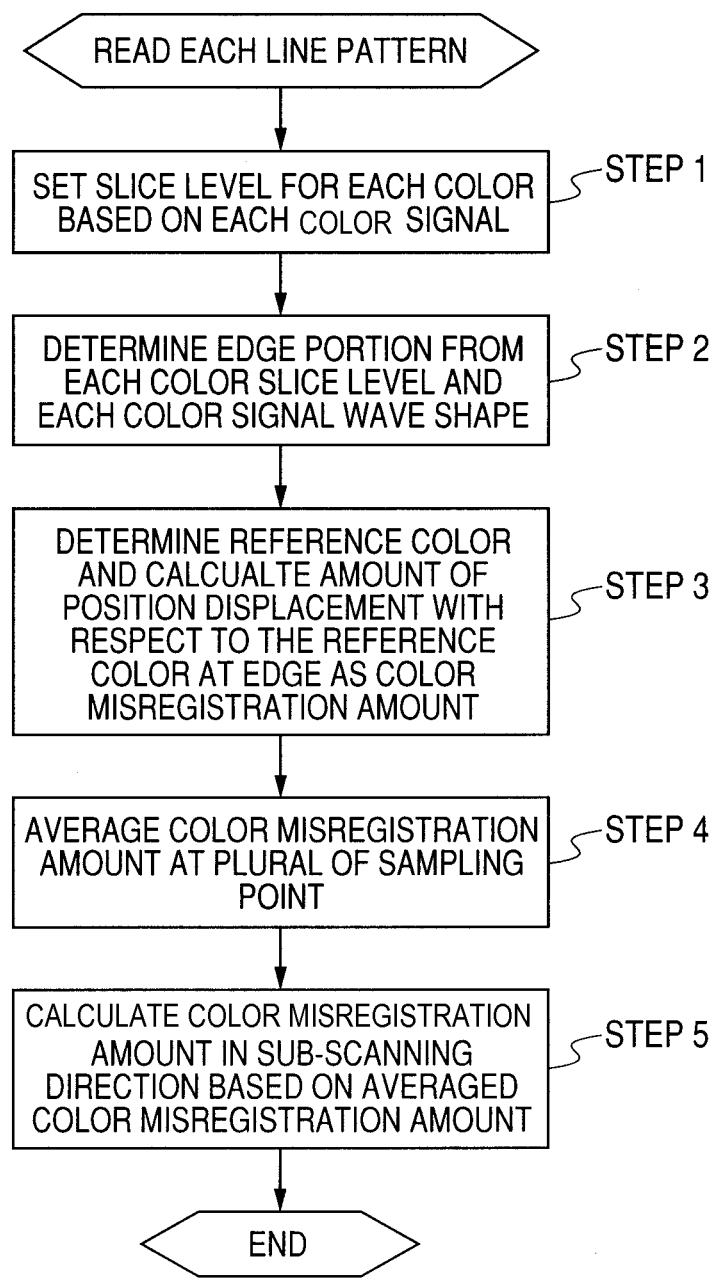

INSPECTION METHOD AND INSPECTION APPARATUS FOR AN IMAGE READING APPARATUS

BACKGROUND OF THE INVENTION

1. Field of the Invention

The present invention relates to an inspection method for an image reading apparatus, and more particularly, to an inspection apparatus for performing an inspection and an evaluation for color misregistration in a reading apparatus for reading a color image.

2. Description of the Related Art

Conventionally, in a flatbed image reading apparatus (image scanner) for reading image information on a surface of an original, in order to simplify the structure of the apparatus, there has been of an integrated-carriage scanning type in which a reflection mirror, an imaging optical system, a line sensor, and the like are integrated into one unit to scan a surface of an original.

In a conventional image reading apparatus of the integrated-carriage scanning type, a light beam emitted from an illumination light source illuminates an original placed on an original table. An optical path of the light beam is deflected when the light beam reflected on the original is reflected in the carriage by means of multiple reflection mirrors. The light beam is imaged on a surface of a line sensor through an imaging optical system. Then, the carriage is moved by a sub-scanning motor in a sub-scanning direction with respect to the surface of the original to read image information of the original. The line sensor has such a configuration that multiple light receiving elements are arranged in a main scanning direction.

FIG. 9 is an explanatory diagram of a basic configuration of an image reading optical system. Line sensors 85R, 85G, and 85B for reading respective colors R (red), G (green), and B (blue) read, via an imaging optical system 84, pieces of image information of reading ranges 87R, 87G, and 87B on the surface of the original, respectively. The carriage moves relative to the surface of the original, and hence the image information on the same point on the surface of the original may be read by different color light beams after given time intervals. In a case where the imaging optical system 84 is formed of a coaxial lens system having a rotationally symmetric surface, longitudinal chromatic aberration and lateral chromatic aberration occur due to characteristics of a lens material. Hence, compared with the line sensor 85G serving as a reference, defocusing or position displacement occur in line images formed on the line sensors 85B and 85R. Consequently, when images of the respective colors are superimposed, the resultant image is such an image that color blurring or color misregistration is conspicuous.

In an imaging optical system using a coaxial lens system having a rotationally asymmetric surface, in which an anamorphic surface is disposed on an image plane side of the imaging optical system (Japanese Patent Application Laid-Open No. 2000-171705), distortion in the sub-scanning direction is likely to occur due to a manufacturing error of the rotationally asymmetric surface, in addition to chromatic aberration due to characteristics of a lens material. Japanese Patent Application Laid-Open No. 2002-335375 discloses a so-called off-axial optical system. That is, in a non-coaxial optical system, a concept of a reference axis is introduced, and a constituent surface is made into an asymmetrical aspherical surface, to thereby correct aberration. However, if the constituent surface has a manufacturing error or a position error, distortion occurs due to focus position displacement on the image plane in the main scanning direction (in the main scanning cross-section) or in the sub-scanning direction (in sub-scanning cross-section), which leads to reduction in focal depth and magnification deviation. Consequently, a read line is curved. In particular, distortion in the sub-scanning direction is very likely to occur. When image information is read by line sensors of the colors R, G, and B, as illustrated in FIG. 10, imaging positions on the line sensors located on outer sides of the sub-scanning direction are displaced in the sub-scanning direction due to this distortion, increasing from the optical axis toward both ends of the line sensors. As a result, color misregistration in the sub-scanning direction occurs in a superimposed image.

In order to measure such a color misregistration amount, the following inspection apparatus is proposed. That is, a test chart in which white bars and black bars are alternately printed in the sub-scanning direction is placed on an original surface of a main body of the apparatus, and the test chart is read, thereby performing a calculation and an inspection for a color misregistration amount (see Japanese Patent Application Laid-Open No. 2000-332958).

Further, in order to calculate a color misregistration amount based on a distortion amount, the following method is proposed. That is, at a position equivalent to a position of a surface of an original, there is provided a chart for detecting reading-position displacement in sub-scanning direction, which includes a triangular chart or a chart having different shapes between the main scanning direction and the sub-scanning direction, and the chart is read to obtain a signal, which is used for calculating a distortion amount, thereby calculating a color misregistration amount (see Japanese Patent Application Laid-Open No. 2008-078877).

Japanese Patent Application Laid-Open No. 2000-332958 has the following problem. That is, a reading unit, which is mounted with an imaging optical system, needs to be moved in the sub-scanning direction (hereinafter, referred to as scan operation) so as to detect a color misregistration amount in the sub-scanning direction, and hence the imaging optical system alone may not be inspected, meaning that an inspection may not be performed until the final process of the product. Further, instead of the reading unit, by causing the test chart to perform the scan operation, the imaging optical system alone may be inspected, but there are problems that the inspection apparatus becomes upsized and complicated, and that an inefficient inspection time occurs due to the scan operation.

In Japanese Patent Application Laid-Open No. 2008-078877, a distortion amount is calculated by using the chart for detecting reading-position displacement in sub-scanning direction, which includes a triangular chart or a chart having different shapes between the main scanning direction and the sub-scanning direction. However, the distortion amount is calculated based on a single chart, and hence Japanese Patent Application Laid-Open No. 2008-078877 has a problem in measurement accuracy because of the small number of samplings.

SUMMARY OF THE INVENTION

In view of the above-mentioned problems, the present invention has an object to provide an inspection method and an inspection apparatus for an image reading apparatus, which are capable of performing color misregistration measurement with high accuracy while avoiding upsizing and complication of the inspection apparatus and also avoiding an increase in inspection time due to the scan operation which may lead to inefficiency.

In order to achieve the above-mentioned object, according to the present invention, there is provided an inspection method for an image reading apparatus in which image information on a surface of an original illuminated by a light source is imaged on multiple light receiving element lines arranged in a main scanning direction through an imaging optical system, and the image information of colors different from each other are read by the respective multiple light receiving element lines, wherein the inspection method for an image reading apparatus comprises: acquiring a first color misregistration amount from image information based on a first striped pattern located at a position optically equivalent to a position of the surface of the original with respect to the light receiving element lines, the first striped pattern having white lines and black lines of a same width alternately aligned, and having longitudinal directions of the white lines and the black lines aligned in a sub-scanning direction; acquiring a second color misregistration amount from image information based on a second striped pattern located at a position optically equivalent to the position of the surface of the original with respect to the light receiving element lines, the second striped pattern having white lines and black lines of a same width alternately aligned, and having longitudinal directions of the white lines and the black lines aligned at an angle from a direction parallel to the main scanning direction; and calculating a color misregistration amount in the sub-scanning direction based on the first color misregistration amount and the second color misregistration amount.

According to the inspection method for an image reading apparatus of the present invention, the color misregistration amount in the sub-scanning direction may be calculated without a need of the scan operation in the sub-scanning direction, which therefore enables preventing the inspection apparatus from becoming upsized, complicated, and inefficient. Further, by using the striped pattern (line pattern) in which the white lines and the black lines having the same width are alternately aligned, the number of samplings obtained from the acquired data may be increased, and hence measurement accuracy may also be increased.

Further features of the present invention will become apparent from the following description of exemplary embodiments with reference to the attached drawings.

BRIEF DESCRIPTION OF THE DRAWINGS

FIG. 3 is a flow chart in which color misregistration in a sub-scanning direction is detected according to the embodiments of the present invention.

DESCRIPTION OF THE EMBODIMENTS

With reference to the drawings, the principle of a detection method and embodiments of the present invention are described below.

(Principle of Detection Method)

Figure 1:
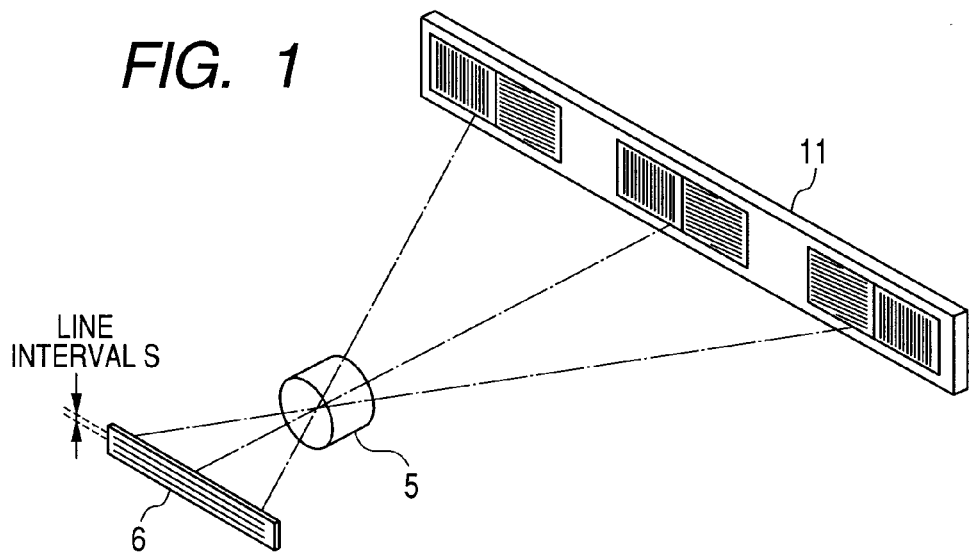
FIG. 1 is a schematic diagram of a main part of a color misregistration inspection apparatus according to embodiments of the present invention.

FIG. 1 is a schematic diagram of a main part of a color misregistration inspection apparatus of the present invention. As illustrated in FIG. 1, information on a color misregistration detection chart 11 is imaged on a reading unit (light receiving element lines) 6 through an imaging optical system 5, wherein the color misregistration detection chart 11 is located at a position optically equivalent to a position of a surface of an original with respect to the reading unit (light receiving element lines) 6. The imaging optical system 5 and the reading unit 6 are secured to a block (not shown). The reading unit 6 is configured to be displaceable to change distance from the imaging optical system 5. Thus, after the focus and magnification are adjusted to determine a position, the reading unit 6 may be secured using such means as screws or bonding.

Figure 2A:
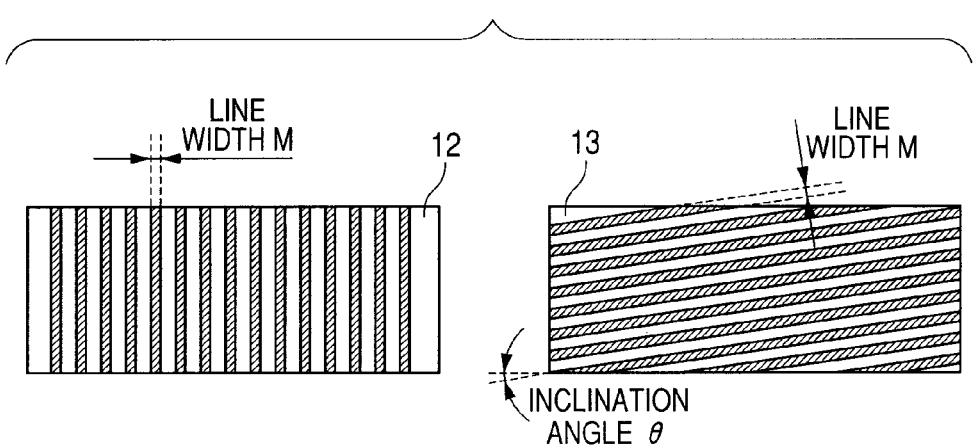
FIGS. 2A and 2B are layout diagrams of a chart used for detecting a color misregistration amount according to the embodiments of the present invention.

As illustrated in FIG. 2A, the color misregistration detection chart 11 is provided with a striped pattern in which white bars and black bars, which are white lines and black lines having a same width, are alternately aligned at regular intervals, that is, a so-called line pattern. The line pattern includes a line pattern (first striped pattern) 12 in which longitudinal directions of the white bars and the black bars, which are the white lines and the black lines, respectively, are aligned in a perpendicular direction to an arrangement direction of the light receiving element lines of the reading unit 6 (main scanning direction), and a line pattern (second striped pattern) 13 in which the white bars and the black bars are aligned at a fixed angle with respect to a parallel direction to the arrangement direction. The term "perpendicular direction" used herein refers to such a direction that is substantially perpendicular to the arrangement direction, falling within a range of ±5° from the direction perpendicular to the arrangement direction. Further, the term "fixed angle with respect to the parallel direction" refers to such an angle that falls within a range of 5° or larger and 10° or smaller with respect to the parallel direction. If the upper limit value is exceeded, other factors become predominant, such as a color misregistration factor in the main scanning direction, and hence measurement accuracy decreases. Further, if the lower limit value is failed, intervals of the line pattern with respect to the main scanning direction increase, which leads to a decrease in the number of sampling points. Hence, the measurement accuracy decreases.

In view of the above, in the embodiments of the present invention, an inclination angle θ is set to 8°.

Further, a line width M of the line pattern (line width of each of the black bars and the white bars) is set so as to satisfy the following conditional expression (1).

$$(i-1) \times \eta \leq |M \times \beta| < i \times \eta \ (i \text{ is an integer}) \tag{1}$$

where β represents an imaging magnification, and η represents a pixel size of a light receiving element.

When the line width M satisfies the conditional expression (1), the frequency of the line width does not become an integral multiple of the arrangement frequency of the light receiving elements, and hence a signal acquired from the line pattern does not get affected by moiré.

In the embodiments of the present invention, color misregistration is detected in the imaging optical system in which the pixel size η is 5.25 μm and a width of an A4 size is imaged with an imaging magnification β of −0.12402. Hence, the line width M is 79.4 μm (corresponding to 320 dpi).

Figure 2B:
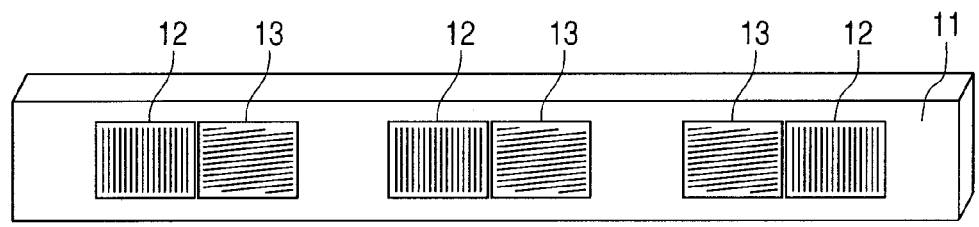

As described below, a color misregistration amount in a sub-scanning direction is determined based on color misregistration amounts detected based on image information of the respective line patterns. For this reason, in order to reduce an influence from measurement position displacement in the main scanning direction as much as possible, there are used at least one first striped pattern 12 and at least one second striped pattern 13. As illustrated in FIG. 2B, the first striped pattern 12 and the second striped pattern 13 are arranged in close proximity to each other in the main scanning direction (arrangement direction of the light receiving elements of the reading unit 6).

Next, a detection method for a color misregistration amount in the sub-scanning direction according to the embodiments of the present invention is described. FIG. 3 illustrates a flow chart of color misregistration detection in the sub-scanning direction.

Figure 4:
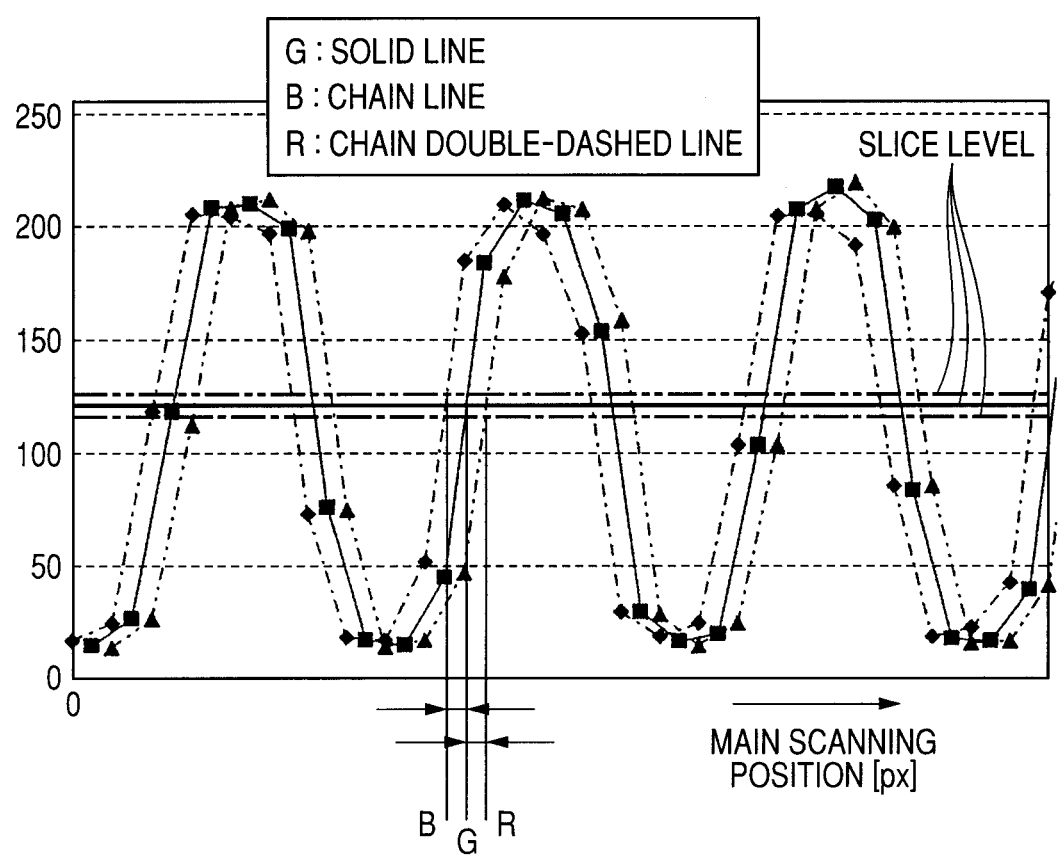
FIG. 4 is a sensor output wave shape graph obtained by reading a line pattern having lines aligned perpendicularly to a main scanning direction according to the embodiments of the present invention.
Figure 5:
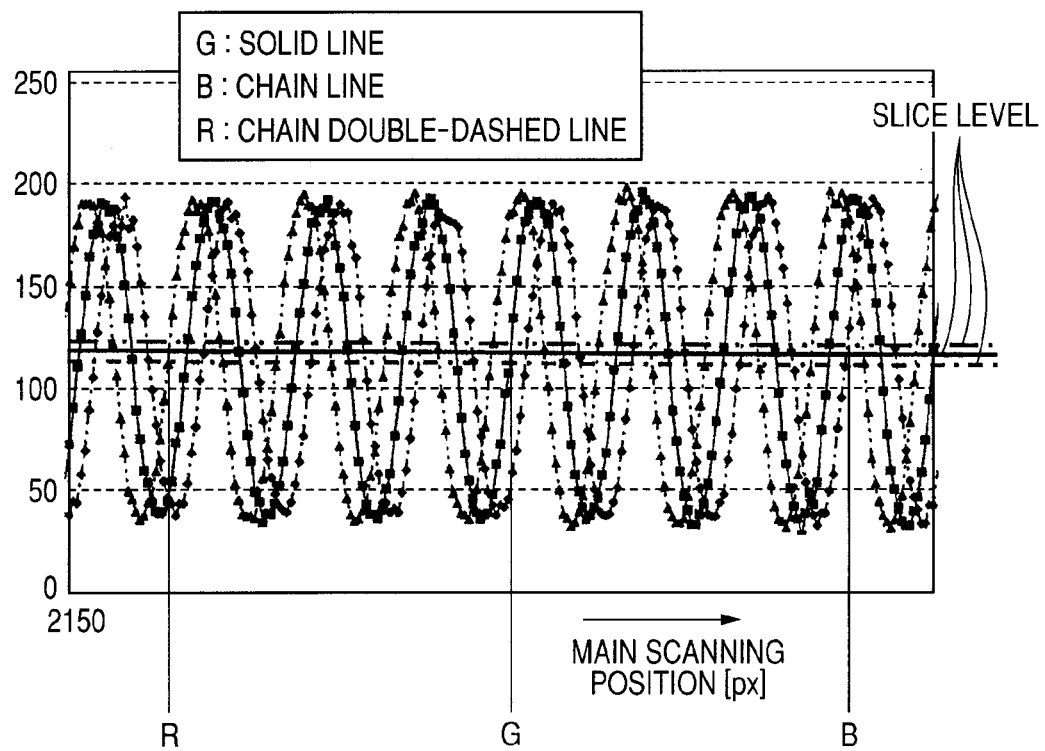
FIG. 5 is a sensor output wave shape graph obtained by reading a line pattern having lines aligned with a fixed inclination angle with respect to the main scanning direction according to the embodiment of the present invention.

First, the color misregistration detection chart 11 is imaged on the reading unit 6 through the imaging optical system 5, and the resultant image is read by the reading unit 6. FIG. 4 is a graph obtained by plotting, with respect to positions in the main scanning direction, read signal intensities of the respective colors (red (R), green (G), and blue (B)) of color light based on image information of the first striped pattern which is read by the reading unit 6. Further, FIG. 5 is a graph obtained by plotting, with respect to the positions in the main scanning direction, read signal intensities of the respective colors (red (R), green (G), and blue (B)) of color light based on image information of the second striped pattern which is read by the reading unit 6.

Based on the read signal intensities of each of the colors R, G, and B with respect to the positions in the main scanning direction, a slice level is set so as to determine for each color whether or not a signal has been detected and represent the determination result as a binary (Step 1).

In the embodiments of the present invention, as a setting method for the slice level, an average value of the read signal intensities of each of the colors R, G, and B is set as a slice level of each color.

An intersection of the slice level set for each color and an output signal wave shape of each of the colors R, G, and B is determined as an edge portion for signal detection of each color (Step 2).

An arbitrary color is determined as a reference color (in the embodiments of the present invention, G (green) is determined as the reference color), and then, the amount of position displacement of an edge portion of each color in the main scanning direction with respect to the edge portion of the reference color is calculated as the color misregistration amount (Step 3).

Here, the second striped pattern 13 is inclined by the fixed angle with respect to the main scanning direction (arrangement direction of the light receiving element lines of the reading unit 6). Hence, as illustrated in FIG. 5, in output signals of the second striped pattern 13, there occurs a displacement in position of each color which corresponds to a phase difference with respect to the position of the reference color. Accordingly, when the amount of position displacement is detected, it is necessary to detect the amount of position displacement at the same line of the line pattern. An average of color misregistration amounts at multiple sampling points (intersection points) is calculated, and then, the resultant is determined as the color misregistration amount in each line pattern (Step 4).

Based on the color misregistration amount of each line pattern and the amount of displacement due to the phase difference, a color misregistration amount in the sub-scanning direction is calculated using an expression described below (Step 5). A color misregistration amount X in the sub-scanning direction is calculated by the following expression (2), $$X = \{Z - (S/\tan\theta) - Y\} \times \tan\theta \qquad (2)$$

where Y represents a color misregistration amount based on image information of the line pattern (first striped pattern) 12 in the perpendicular direction (first color misregistration amount), Z represents a color misregistration amount based on image information of the line pattern (second striped pattern) 13 inclined by the fixed angle (second color misregistration amount), S represents an interval between the light receiving element lines adjacent to each other, and θ represents the angle by which the second striped pattern 13 is inclined with respect to the main scanning direction.

The color misregistration amount thus calculated is compared with an acceptable range of the color misregistration amount in the sub-scanning direction where the acceptable range is set in advance, thereby enabling an inspection.

Hereinbelow, embodiments that employ the above-mentioned detection method are described.

First Embodiment

Figure 6:
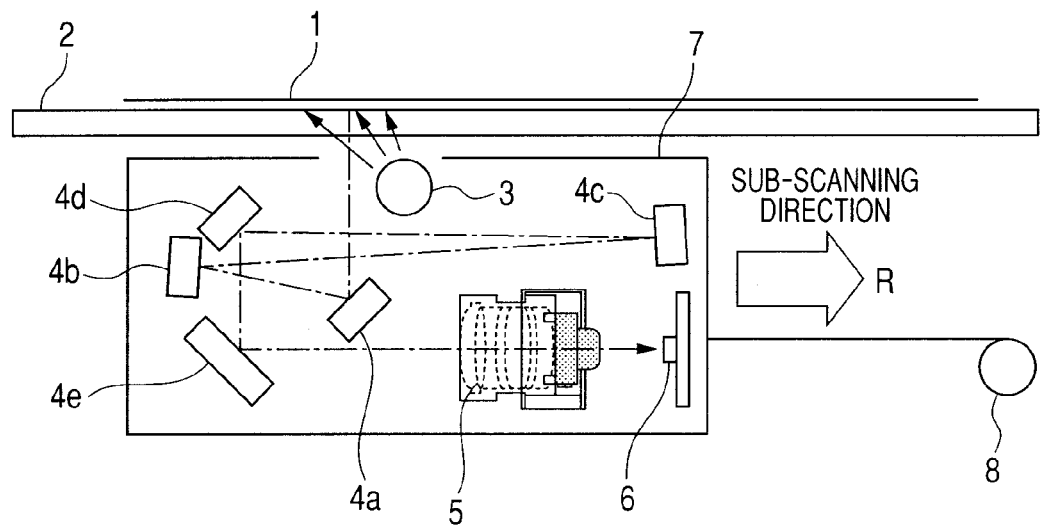
FIG. 6 is a schematic diagram of a main part of an image reading apparatus taken as one example to which the present invention is applied.

FIG. 6 is a schematic diagram of a main part of an image reading apparatus, such as an image scanner or a copier, which is taken as one example to which the present invention is applied.

The image reading apparatus includes a carriage 7, original table glass 2, and a sub-scanning mechanism 8 including a sub-scanning motor and the like. The carriage 7 integrally contains an illumination system 3 serving as a light source, multiple reflection mirrors 4a, 4b, 4c, 4d, and 4e, the imaging optical system 5, the reading unit 6, and the like. The carriage 7 is moved in the sub-scanning direction (direction of arrow B) by the sub-scanning mechanism 8 to scan a surface of an original 1 placed on a surface of the original table glass 2, thereby reading image information on the surface of the original.

The illumination system 3 is formed of, for example, a xenon tube, a halogen lamp, or an LED array. It should be noted that a reflection plate such as an aluminum deposited plate may be used in combination for the illumination system 3. A first reflection mirror 4a, a second reflection mirror 4b, a third reflection mirror 4c, a fourth reflection mirror 4d, and a fifth reflection mirror 4e deflect an optical path of a light beam reflected on the original 1 in the stated order in the carriage 7.

The imaging optical system 5 forms, on the reading unit 6, an image of the light beam based on image information of the original 1. The imaging optical system 5 is configured by, for example, a refractive optical system formed of a rotationally symmetric surface, a refractive optical system including a rotationally asymmetric aspherical surface, or an off-axial reflecting optical system. The reading unit 6 is formed of a so-called monolithic three-line sensor in which three line sensors (CCD sensors, CMOS sensors, or the like) are arranged in parallel to a one-dimensional direction (main scanning direction). Color filters (not shown) based on the respective colors (red (R), green (G), and blue (B)) of the color light are provided to the respective surfaces of the three line sensors. The three line sensors read different pieces of color information (R, G, and B), respectively.

In this embodiment, a light beam emitted from the illumination system 3 illuminates the original 1 directly or via a light reflector (not shown). The optical path of the light beam reflected from the original 1 is deflected via the first reflection mirror 4a, the second reflection mirror 4b, the third reflection mirror 4c, the fourth reflection mirror 4d, and the fifth reflection mirror 4e in the carriage 7. Then, the imaging optical system 5 forms an image on the surfaces of the line sensors (on the light receiving element lines). The carriage 7 is moved by the sub-scanning mechanism 8 in the sub-scanning direction (direction of arrow B) to read image information of the original 1. Then, the image information thus read is sent to an external device, such as a personal computer or a printer, via an interface (not shown).

In this embodiment, as illustrated in FIG. 2B, three pairs of the line patterns 12 and 13 are located in the main scanning direction at positions optically equivalent to the position of the surface of the original with respect to the light receiving element lines. In case where the imaging optical system 5 is a refractive lens having a rotationally asymmetric surface with the imaging magnification $\beta$ being $-0.12402$, the pixel size $\eta$ of the light receiving elements is 5.25 μm, the line width S of the black bars and the white bars, which are the black lines and the white lines of the line pattern, is 79.4 μm, and the inclination angle $\theta$ of the black bars and the white bars of the line pattern with respect to the arrangement direction of the light receiving element lines (main scanning direction) is 8°, the color misregistration amount in the sub-scanning direction is calculated using the above-mentioned calculation method. Results thereof are shown in FIG. 7 and Table 1.

TABLE 1

| Main scanning position | Color misregistration in perpendicular line pattern | | Color misregistration in inclined line pattern | | Color misregistration in sub-scanning direction | |
|---|---|---|---|---|---|---|
| | R-G | B-G | R-G | B-G | Sub-scanning direction (R-G) | Sub-scanning direction (B-G) |
| −85 | −0.06 | 0.02 | 84.467 | −84.383 | −0.123 | 0.140 |
| 0 | 0 | 0 | 84.993 | −85.044 | −0.057 | 0.050 |
| 85 | 0.06 | −0.02 | 84.587 | −84.423 | −0.123 | 0.140 |

Figure 7:
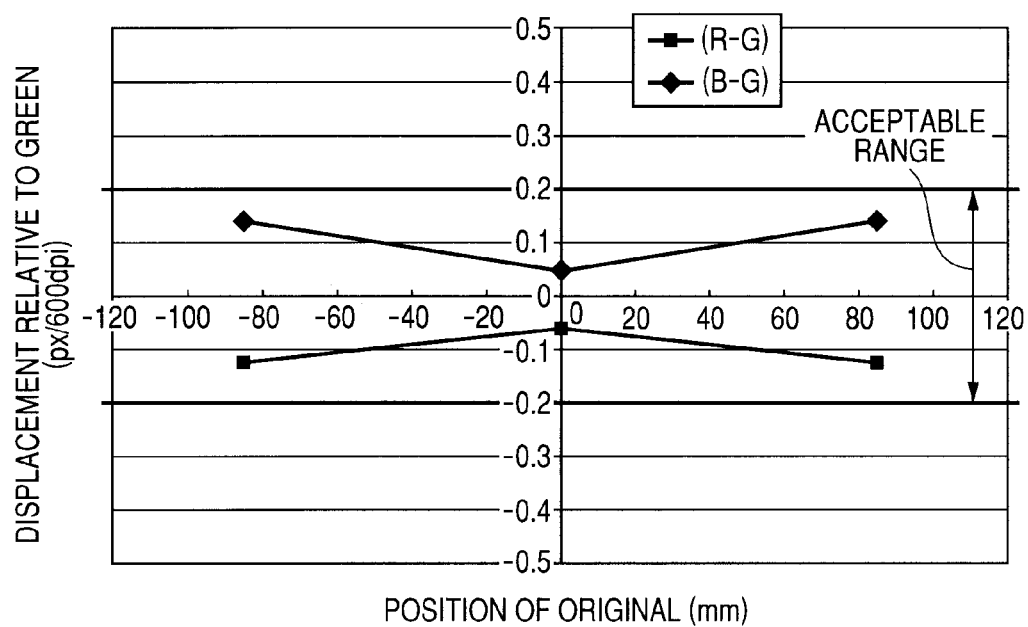
FIG. 7 shows color misregistration amounts in the sub-scanning direction, which are calculated by a method according to the embodiment of the present invention.

FIG. 7 is a graph obtained by plotting, along the abscissa representing the position of the original (position in the main scanning direction) (mm), the color misregistration amounts of the color (B) and the color (R) in the sub-scanning direction with respect to the reference color (G). As is apparent from FIG. 7, the color misregistration amounts in the sub-scanning direction may be calculated at the respective main scanning positions, thereby enabling a comparison with an acceptable color misregistration amount.

With the inspection method for the image reading apparatus according to this embodiment, the color misregistration amount in the sub-scanning direction may be detected without requiring a scan operation in the sub-scanning direction, and hence, even if a product is not in the final assembly, an inspection may be performed with a carriage alone. In addition, an inspection may be performed with a simple configuration, and hence the inspection apparatus may be prevented from becoming upsized, complicated, and less efficient.

Second Embodiment

Figure 8:
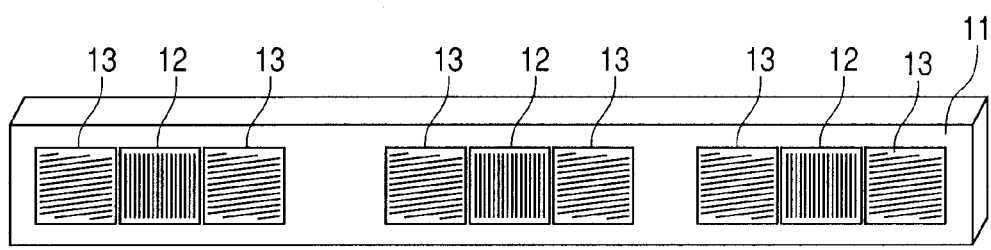
FIG. 8 is a layout diagram of a chart used for detecting color misregistration according to a second embodiment of the present invention.
Figure 9:
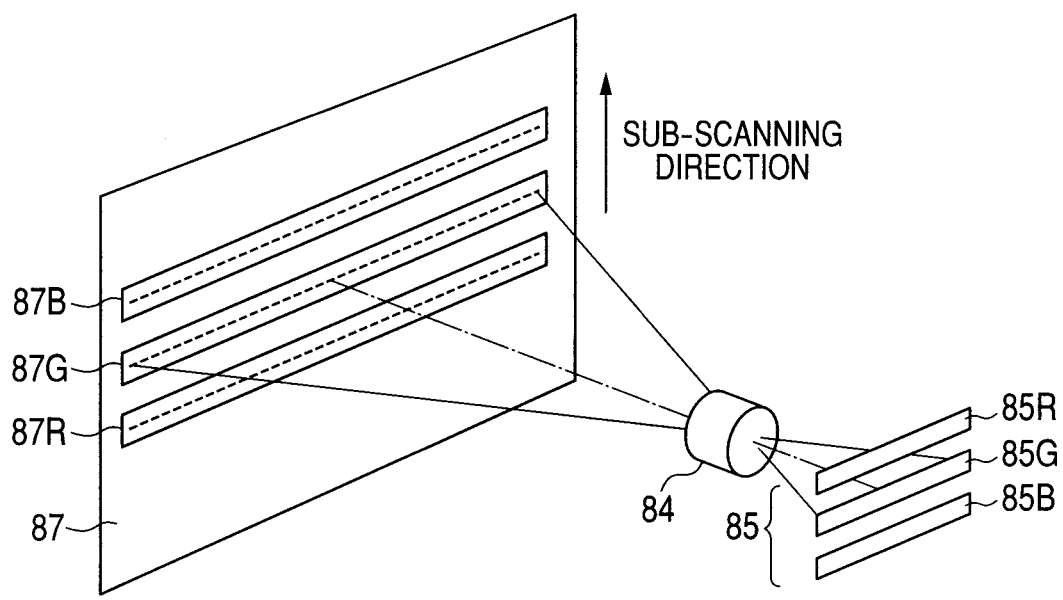
FIG. 9 is an explanatory diagram of a basic configuration of a color image reading optical system.
Figure 10:
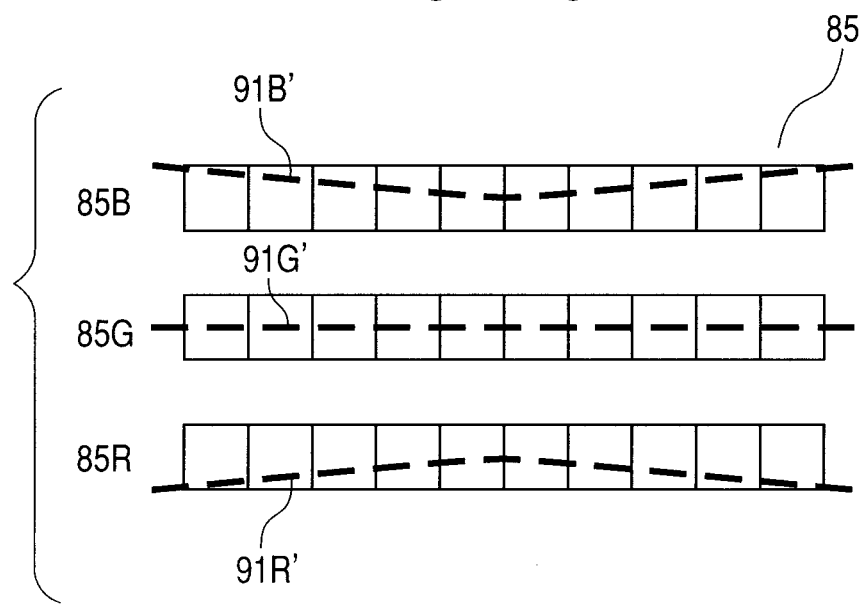
FIG. 10 is a diagram illustrating an outline of position displacement of lines imaged on surfaces of line sensors.

FIG. 8 is different from FIG. 2B in that the arrangement of the line patterns 12 and 13 has been changed. In this embodiment, the first striped pattern 12 is located between two second striped patterns 13.

By providing two second striped patterns 13 (line patterns inclined with the fixed angle with respect to the arrangement direction of the light receiving element lines (main scanning direction)), the number of samplings may be increased at edge portions that are intersections of the slice level and the output signal wave shape of the light receiving elements. Further, in view of the fact that the color misregistration amount is obtained through the process of the averaging, the color misregistration amount thus calculated represents the color misregistration amount of the main scanning position at which the line pattern having lines aligned in the perpendicular direction (first striped pattern) is located.

Therefore, the color misregistration amount in the sub-scanning direction may be calculated with higher accuracy compared with the method of arranging the first striped pattern and the second striped pattern in close proximity to each other according to the first embodiment.

Further, the present invention is not limited to the above-mentioned embodiments, and various modifications may be made without departing from the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-238335, filed Oct. 15, 2009, which is hereby incorporated by reference herein in its entirety.

What is claimed is:

1. An inspection method for an image reading apparatus in which image information on a surface of an original illuminated by a light source is imaged on multiple light receiving element lines arranged in a main scanning direction through an imaging optical system, and the image information of colors different from each other are read by the respective multiple light receiving element lines, the inspection method for the image reading apparatus comprising:

acquiring a first color misregistration amount from image information based on a first striped pattern located at a position optically equivalent to a position of the surface of the original with respect to the multiple light receiving element lines, the first striped pattern having white lines and black lines of a same width alternately aligned, and having longitudinal directions of the white lines and the black lines aligned in a sub-scanning direction;

acquiring a second color misregistration amount from image information based on a second striped pattern located at a position optically equivalent to the position of the surface of the original with respect to the multiple light receiving element lines, the second striped pattern having white lines and black lines of a same width alternately aligned, and having longitudinal directions of the white lines and the black lines inclined with respect to the main scanning direction; and calculating a color misregistration amount in the sub-scanning direction based on the first color misregistration amount and the second color misregistration amount.

2. An inspection method for an image reading apparatus according to claim 1, wherein the acquiring of the first color misregistration amount and the acquiring the second color misregistration amount each comprise:

determining an edge portion of an output signal of each color with respect to a position thereof in the main scanning direction, the output signal being obtained based on the image information of one of the first striped pattern and the second striped pattern;

setting an arbitrary color as a reference color; and calculating, as the color misregistration amount, an amount of position displacement of the edge portion of the each color in the main scanning direction with respect to the reference color.

3. An inspection method for an image reading apparatus according to claim 1, wherein, in the calculating of the color misregistration amount in the sub-scanning direction, the color misregistration amount (X) in the sub-scanning direction is calculated by the following expression:

$$X = \{Z - (S/\tan\theta) - Y\} \times \tan\theta$$

where Y represents the first color misregistration amount, Z represents the second color misregistration amount, S represents an interval between the multiple light receiving element lines adjacent to each other, and θ represents an angle formed between the longitudinal direction of the black lines of the second striped pattern and the main scanning direction.

4. An inspection method for an image reading apparatus according to claim 1, wherein a line width (M) of the black lines and the white lines of the first striped pattern and the second striped pattern satisfies the following expression:

$$(i-1) \times \eta < |M \times \beta| < i \times \eta$$

where β represents an imaging magnification of the imaging optical system, η represents a pixel size of the multiple light receiving element lines, and i represents an integer.

5. An inspection method for an image reading apparatus according to claim 1, wherein the first striped pattern is located in a sandwiched manner between two second striped patterns.

6. An inspection method for an image reading apparatus according to claim 1, wherein the angle of the second striped pattern is 5° or larger and 10° or smaller.

7. An inspection apparatus for an image reading apparatus in which image information on a surface of an original illuminated by a light source is imaged on multiple light receiving element lines arranged in a main scanning direction through an imaging optical system, and the image information of colors different from each other are read by the respective multiple light receiving element lines, the inspection apparatus for the image reading apparatus comprising:

means for acquiring a first color misregistration amount from image information based on a first striped pattern located at a position optically equivalent to a position of the surface of the original with respect to the multiple light receiving element lines, the first striped pattern having white lines and black lines of a same width alternatively aligned, and having longitudinal directions of the white lines and the black lines aligned in a sub-scanning direction;

means for acquiring a second color misregistration amount from image information based on a second striped pattern located at a position optically equivalent to the position of the surface of the original with respect to the multiple light receiving element lines, the second striped pattern having white lines and black lines of a same width alternately aligned, and having longitudinal directions of the white lines and the black lines inclined with respect to the main scanning direction; and means for calculating a color misregistration amount in the sub-scanning direction based on the first color misregistration amount and the second color misregistration amount.

8. A manufacturing method for an image reading apparatus in which image information on a surface of an original illuminated by a light source is imaged on multiple light receiving element lines arranged in a main scanning direction through an imaging optical system, and the image information of colors different from each other are read by the respective multiple light receiving element lines, the manufacturing method for the image reading apparatus comprising:

acquiring a first color misregistration amount from image information based on a first striped pattern located at a position optically equivalent to a position of the surface of the original with respect to the multiple light receiving element lines, the first striped pattern having white lines and black lines of a same width alternately aligned, and having longitudinal directions of the white lines and the black lines aligned in a sub-scanning direction;

acquiring a second color misregistration amount from image information based on a second striped pattern located at a position optically equivalent to the position of the surface of the original with respect to the multiple light receiving element lines, the second striped pattern having white lines and black lines of a same width alternately aligned, and having longitudinal directions of the white lines and the black lines inclined with respect to the main scanning direction;

calculating a color misregistration amount in the sub-scanning direction based on the first color misregistration amount and the second color misregistration amount; and assembling the image reading apparatus with an imaging optical system which was inspected based on the color misregistration amount.

* * * * *